Aug. 30, 1960  O. NEWMAN  2,950,567
PLANT TERRARIUM
Filed Sept. 15, 1958

INVENTOR
Oliver Newman

Robert R. Churchill

ATTORNEY

United States Patent Office 2,950,567
Patented Aug. 30, 1960

2,950,567

PLANT TERRARIUM

Oliver Newman, 82 Bromfield St., Wollaston 70, Mass.

Filed Sept. 15, 1958, Ser. No. 760,977

9 Claims. (Cl. 47—17)

This invention relates to a plant terrarium.

The invention has for an object to provide a novel and improved plant terrarium particularly adapted for use in growing plants indoors and having novel structure arranged to enable the atmospheric conditions within the terrarium to be controlled.

With this general object in view and such others as may hereinafter appear, the invention consists in the plant terrarium and in the various structures, arrangements and combinations of parts hereinafter described and particularly defined in the claims at the end of this specification.

In the drawings illustrating the preferred embodiment of the invention:

Figure 1:
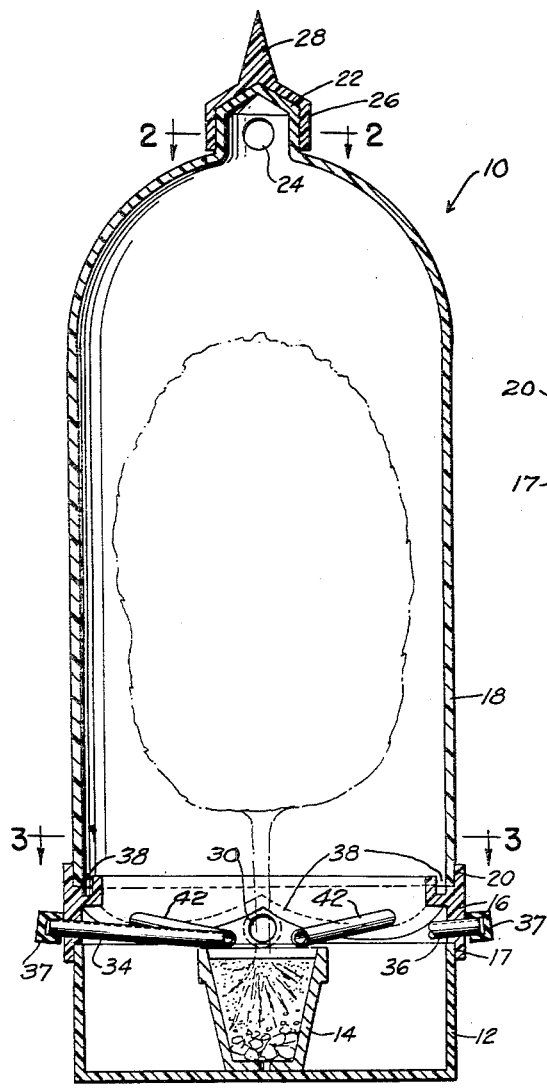
Fig. 1 is a vertical cross sectional view of a plant terrarium embodying the present invention.

In general the present invention contemplates a novel plant terrarium providing an enclosed protective chamber or housing for plants and which is characterized by novel structure particularly adapted to provide controlled conditions of humidity and ventilation within the housing to simulate varying growing conditions for different plants, and to substantially eliminate abrupt temperature changes or other adverse atmospheric conditions in the room where the terrarium is located. In accordance with an important feature of the present invention, provision is made for the collection of any condensation which may form and accumulate on the interior of the chamber or housing and to guide and return such condensate back to the soil in the plant container. Novel provision is also made in the present terrarium for feeding the plant from the exterior of the chamber while maintaining stable atmospheric conditions within the container.

Referring now to the drawings, the present plant terrarium indicated at 10 may and preferably will comprise a transparent material, such as glass or a plastic material, and includes a hollow cylindrical base member 12 open at the top and arranged to receive a flower pot or plant container 14; an annular intermediate member 16 which may be termed the "service member" and which is provided with an annular grooved portion 17 at its lower end removably fitted over the base member; and an elongated cylindrical transparent housing 18 providing a chamber supported and removably fitted at its lower end in an annular groove 20 formed in the upper end of the service member 16.

Figure 2:
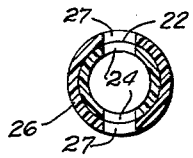
Fig. 2 is a horizontal sectional detail view taken on the line 2—2 of Fig. 1.

The upper end of the housing 18 is provided with an extension 22 having one or more vent openings 24 in the walls thereof which may be closed by a cap member 26. The walls of the cap member 26 may also be provided with one or more corresponding vent openings 27 which may be aligned with the openings 24 in the extension 22 to provide communication between the interior of the chamber and the surrounding air. The cap member may also be provided with an upwardly extended handle 28 for convenience in manually rotating the cap member to present the communicating openings into or out of alignment according to the ventilation desired, the openings being shown in aligned position in Fig. 2. As illustrated in Fig. 1, the height of the base member 12 may correspond generally to the height of the plant container 14.

The annular service member 16 is provided with opposed removable ventilating plugs 30, 32 fitted into openings in the service member, one or both of which may be removed when desired to provide ventilation, either alone or in conjunction with the upper vent openings 24, 27. It will be apparent that when both the upper and lower vent openings are open the room air may circulate through the housing. The service member 16 is also provided with opposed feed tubes 34, 36 which may be formed integrally with the service member, or may comprise separate tubes fitted therein. As illustrated, the tubes 34, 36 extend a short distance laterally outwardly from the annular service member 16 and also extend inwardly and downwardly, terminating immediately above the plant container, thus providing channels through which the plants may be watered or fed liquid plant food by means of a squeeze bottle containing the same, or which may be connected by rubber tubes to a source of the water or liquid plant food. The air entering the feed tubes 34, 36 may be such as to take care of minimum ventilation requirements, or if desired, the outwardly extended ends thereof may be capped with a removable cap member 37 as illustrated.

Figure 4:
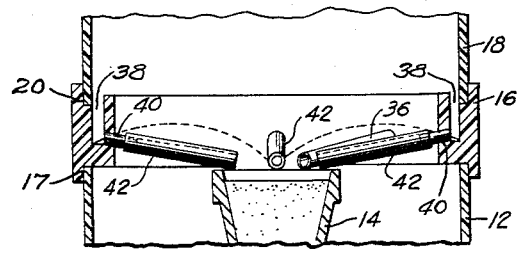
Fig. 4 is a vertical cross section taken on the line 4—4 of Fig. 3.
Figure 3:
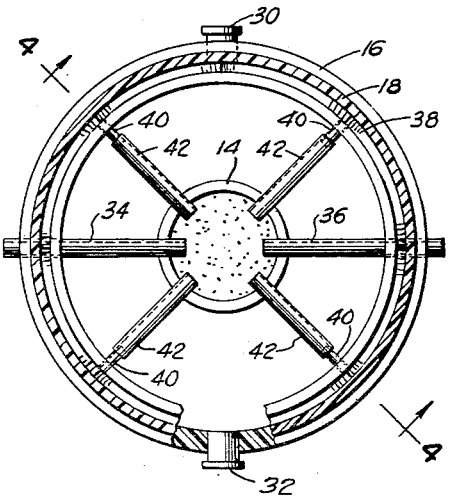
Fig. 3 is a horizontal section taken on the line 3—3 of Fig. 1.

In operation the moisture in the soil of the plant container may vaporize to provide a humid atmosphere within the chamber, and the atmospheric conditions within the chamber may be varied by opening or partially opening any one or more of the various ventilating openings to suit the particular growth requirements of the plant contained therein. In practice such moisture may form as a condensate on the interior walls of the housing 18, and such condensate will run down the walls into the annular service member 16. As herein illustrated, the service member is provided with an annular groove 38 of varying depth in which the condensate may accumulate. In the illustrated embodiment of the invention the groove 38 is provided with four high spots and four low spots for forming inclined portions down which the condensate may run to accumulate at the low spots. As shown in Figs. 3 and 4, each low spot may be provided with a nipple 40 to which a flexible tube, such as a flexible plastic tube 42, may be connected, the free ends of the tubes extending radially inwardly to rest on the edge of the plant container, herein shown as a flower pot, or on the surface of the soil therein, thus returning the condensate to the plant.

From the above description it will be seen that the present plant terrarium enables plants to be grown indoors under conditions substantially simulating atmospheric conditions within a green house and also serves to protect the plant from the numerous adverse growing conditions normally encountered in the average home where dryness, sudden temperature drops, drafts, gases, insects and other hazards are commonly encountered and which may adversely affect the health and growth of plants. It will also be observed that the present terrarium provides novel means for feeding the plants from the exterior of the housing and also for collecting and returning to the plant any condensate formed on the interior of the housing.

In practice whenever temperature conditions require that additional heat be provided within the terrarium a conventional heater of any suitable type may be installed in the base member. For display purposes and for auxiliary heating a light may be disposed within the chamber.

While the preferred embodiment of the invention has been herein illustrated and described, it will be understood that the invention may be embodied in other forms within the scope of the following claims.

Having thus described the invention, what is claimed is:

1. A plant terrarium of the character described comprising a transparent housing forming an enclosed chamber for a plant and its container, the walls of said housing being spaced from said container, ventilating means formed in the housing for controlling the atmosphere within the chamber, and means accessible from the exterior of the housing through which water and plant food may be introduced into the plant container, said means comprising at least one feed tube having one end extending through the housing wall, the other end of the tube adapted to rest on the upper edge of the plant container.

2. A plant terrarium of the character described comprising a transparent housing forming an enclosed chamber for a plant and its container, the walls of said housing being spaced from said container, said housing having means accessible from the exterior of the housing through which water and plant food may be supplied to the container, said means comprising at least one feed tube having one end extending through the housing wall, the other end of the tube adapted to rest on the upper edge of the plant container.

3. A plant terrarium of the character described comprising a transparent housing forming an enclosed chamber for a plant and its container, the walls of said housing being spaced from said container, and means comprising a grooved portion formed adjacent the lower end of the housing for collecting condensate formed on the interior walls of the housing, and at least one pipe having one end communicating with and extended from said grooved portion and having its other end resting on the upper edge of the container for guiding the condensate into the plant container.

4. A plant terrarium of the character described comprising a transparent housing forming an enclosed chamber for a plant and its container, the walls of said housing being spaced from said container, ventilating means formed in the housing for controlling the atmosphere within the chamber, means including a grooved portion adjacent the lower end of the housing and disposed in a plane above the top of the plant container for collecting condensate formed on the interior walls of the housing, and means including flexible pipes for guiding the accumulated condensate into the plant container, one end of each pipe communicating with and extending from said grooved portion, the other end adapted to rest on the upper edge of the plant container to drain the condensate by gravity into the container.

5. A plant terrarium as defined in claim 4 which includes means accessible from the exterior of the housing through which water and liquid plant food may be supplied to the container, said means comprising a plurality of tubes extended through the walls of the housing and engaged with the upper edge of the plant container.

6. A plant terrarium of the character described comprising an assembly including a base member, an intermediate member and a transparent housing member fitted together and forming an enclosed chamber for a plant and its container, the walls of said housing being spaced from the container and the intermediate member disposed in a plane above the top of the container, ventilating means comprising normally closed spaced upper and lower openings arranged to be adjustably opened to permit circulation of air within the chamber whereby to control the atmosphere therein, and a plurality of feed tubes, each tube having one end extended through the wall of said intermediate member and accessible from the exterior thereof, the other end of each tube resting on the upper edge of said container for supplying water or liquid plant food to the container.

7. A plant terrarium as defined in claim 6 which includes means for collecting condensate formed on the interior walls of the housing and for guiding the condensate into the plant container comprising a grooved portion formed in said intermediate member, said grooved portion being of variable depth forming a plurality of low spots, and a plurality of flexible drain pipes, each having one end in communication with and extended from its respective low spot, the other end of each pipe adapted to rest on the upper edge of said plant container.

8. A plant terrarium of the character described comprising an assembly including a base member, an intermediate member and a transparent housing member fitted together and forming an enclosed chamber for a plant and its container, the walls of said housing being spaced from the container and the intermediate member disposed in a plane above the top of the container, and means for collecting condensate formed on the interior walls of the housing and for guiding the condensate into the plant container comprising a grooved portion formed in said intermediate member, said grooved portion being of variable depth forming a plurality of low spots, and a plurality of flexible drain pipes, each having one end in communication with and extended from its respective low spot, the other end of each pipe adapted to rest on the upper edge of said plant container.

9. A plant terrarium as defined in claim 3 wherein the interior of the chamber above said grooved portion is shaped to guide the condensate down the walls of the housing into said grooved portion and is free of any surfaces which might cause dripping of the condensate onto the plant.

References Cited in the file of this patent

UNITED STATES PATENTS

| 1,810,236 | Bender | June 16, 1931 |
| 2,138,188 | Morley | Nov. 29, 1938 |

FOREIGN PATENTS

| 18,026 | Great Britain | Dec. 31, 1887 |